Sept. 10, 1957     D. RUBENSTEIN     2,805,448

METHOD OF MAKING COMPOSITE STRUCTURAL MEMBERS

Filed June 10, 1955

INVENTOR
DAVID RUBENSTEIN
BY
Curtis Morris & Safford
ATTORNEYS:

United States Patent Office 2,805,448
Patented Sept. 10, 1957

2,805,448

METHOD OF MAKING COMPOSITE STRUCTURAL MEMBERS

David Rubenstein, San Diego, Calif.

Application June 10, 1955, Serial No. 514,661

12 Claims. (Cl. 18—60)

This invention relates to composite structural members of the type having a concrete or other stone-like body and a surface layer of high strength plastic composition.

In prior applications, I have disclosed and claimed high strength structural elements and the method of making them in which a concrete block or other stone-like structure is provided with a high tensile strength surface layer integrally bonded into the concrete; and, specifically, I have disclosed the use of plastic compositions reinforced with fiber glass or other high tensile strength fiber in woven or unwoven mat form.

I have now found that a greatly superior product is obtained if, instead of using the ordinary surface of the concrete or other stone-like structure, a portion of its surface is sawed or ground or otherwise dressed off, so as to expose a more porous and uniform part of the material, free from stresses and cracks which may occur at the surface of such articles. Thus, the surface of the material is accurately conformed to that of a mold by which the high strength resin surface is to be formed.

The materials which form the high strength layer are applied to the dressed face and molded under pressure against said mold surface.

My several prior copending applications refer to prestressed preloaded structures and constructions as well as to individual decorative and decorative-structural concrete blocks and masonry bodies in which the present invention provides the features of accurately conformed surfaces. In the commercial production of precast concrete products, and especially machine made concrete blocks, the surface of such concrete bodies or masonry body-like constructions, are not produced having a plumb, true and level plane surface. Curing shrinkage of concrete and generally all masonry products, mold wear and vibration developed on the manufacturing machines of said bodies, or in the inaccuracies of form work or casting molds, and especially in the handling of such products of raw masonry from machines to the curing areas or rooms, contribute to this inaccuracy of dimension and of surface and work against the precision manufacture of said concrete or masonry constructions. In the hollow core concrete blocks, e. g., the exposed faces have an undulating surface protruding from a true plane at the points on the surface of the block opposite the web portion thereof and receding from a true plane at the points of the surface opposite the hollow cores thereof.

In precast concrete blocks or bodies or in fact any masonry body having a radius or curved face, in which the curve is either a single curve or a compound curve, or a flat surface contiguous to and with a curved surface, e. g., a bull-nose corner concrete body or block, or even a rectangular or square flat surface concrete or masonry body, it being a feature inherent in mass production that concrete and masonry products do not cure and set into final finished form to make a precision type of product having precise and true plane surfaces. The effects of mold wear of the mold box e. g., in a conventional mass production concrete block machine, and the shrinkage normal to the concrete or clay product or the like, masonry type body or bodies, in practical production generally make the product of uneven dimension and not having plane surfaces. An accepted tolerance is not an established condition of manufacture because of the nature of the mass production equipment and the technique of its production use.

In ordinary concrete and masonry construction this is not objectionable but in carrying out the practice of portions of my inventions it is most objectionable, particularly in my structures to support substantial static and dynamic loadings, as well as in decorative-structural and decorative constructions.

The use of fibers such as fiber glass, a preferred reinforcement, but not limited thereto, provides high tensile strength to said reinforcement. However, fiber glass, e. g., is not adapted by itself to abrasion resistance or shear and unless the fibrous strands are protected, they are damaged or broken for their use as tensile reinforcement, which reinforcement, provides a high degree of resistance to flexural loadings and especially in resistance to impact-impulse loadings.

I have found that the normal unevenness of cast concrete surfaces cuts through adjacent reinforcement when I process the materials of my invention in thin laminated constructions combined with concrete bodies, and find that it requires substantial quantities of plastic resin composition, whether filled or unfilled resins, to protect the fibrous material advantageously against damage. Also in the interest of uniformity of structural integrity in load bearing characteristics it is vital to have the laminated construction of advantageously precise uniform thickness for uniform capacity in load carrying abilities. The press pressures of my invented processing equipment while of a low pressure nature, does and can in the processing of thin laminated reinforcements to concrete bodies provide sufficient pressure to cut through unprotected fibers that lay between a mold face and a concrete body in a body of plastic resin in its polymerizable state. Even contact pressure of ordinary concrete bodies can impair tensile qualities of fibers such as fiber glass when protuberances from the concrete body project into the reinforcement when its component is in its liquid phase, i. e., the plastic resin is flowable or becomes flowable in the processing steps of the method of construction. The enveloped materials of my Patent No. 2,671,158 when applied in use with the improvements of this invention can be applied in a sticky but firm bonding which upon the addition e. g., of heat cause the plastic resin composition to become flowable into and on the concrete body or masonry body before it converts into a solid state. Polyester resins of my experience have this property as examples thereof, but other plastic resins have this property alone or in combination with discrete materials or resins. My copending applications Serial No. 340,642 filed January 16, 1953 and my copending application Serial No. 345,084 filed March 27, 1956 as continuations-in-part to my prior applications copending Serial No. 229,852 filed June 4, 1951 are provided with improved method by the present application for invention and for which the present application is a continuation-in-part.

Advantageously, the resin material and a mat of reinforcing fiber are assembled with this prepared surface in or on a mold pan or other molding surface, and are then molded under pressure. The mat or other fibrous fabric is smoothed to fit the surface of the mold and the stone-like base. Since the distance of the mold surface from the prepared surface of the concrete is substantially uniform throughout the area, the resin is uniformly pressed and driven uniformly into the structure of the concrete; and likewise the saturated mat is uniformly pressed so that the resin remains properly distributed in it with no high areas in which excess pressure would tend to squeeze the resin out of the fiber and leave the fiber exposed or inadequately bonded.

The accompanying drawing shows a preferred embodiment of the invention.

Figure 1 is a fragmentary cross section, on an enlarged scale, of a concrete block 10 as cast, showing the more porous interior structure 11 and the relatively denser surface 12 where the liquid concrete was pressed against a mold surface during setting, and also shows the lack of perfect uniformity and incipient cracking at the surface due to distortion during setting and after molding.

Figure 1:
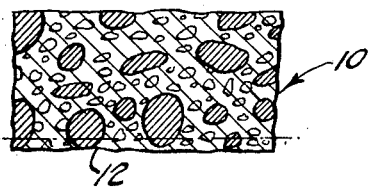
Figure 2:
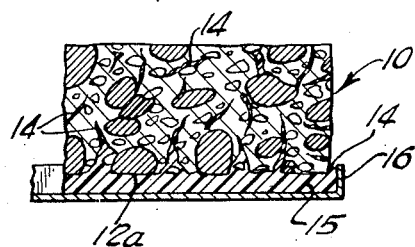
Figure 2 shows the same block placed in a mold with a polymerizable resin composition 14 saturating and in excess on a fibrous mat 15.
Figure 3:
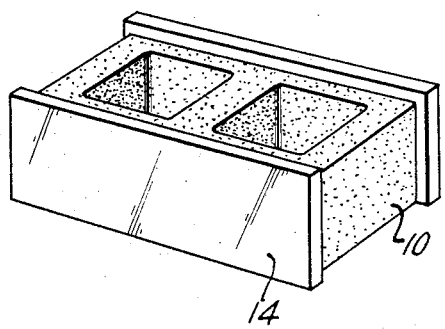
Figure 3 is an isometric view of a finished concrete block made in accordance with the invention.

In making the block shown in Figures 1 to 3, inclusive, according to the present invention a concrete block 10 is first made in the usual way, e. g., by molding in a concrete block machine; and the block is thoroughly set and cured. The block is then passed through a masonry saw to saw off a thin layer from the face of the block, and to leave the block with a substantially plane face. The block with the dressed face 12a is then subjected to radiant heating advantageously with circulation of dry air over the face; and all dust from the sawing operation is removed by cleaning means, e. g., a brush, or an air jet, or a vacuum cleaner dust collector, or even any type of suction type of a vacuum cleaner, thus leaving the face of the block in smooth, clean, dry condition ready for bonding to a resin or resinous or plastic composition.

I use a blended or plain polyester resin 14 of the type used in making reinforced plastic resin fiber glass constructions and generally of the type of polyester resins known as unsaturated polyester resins which is placed in the bottom of a molding pan 16 of stainless steel with a perfectly plane molding face treated with a mold release agent; or the polyester resin composition or other plastic resin composition e. g., epoxy resin composition, can be placed on top of the concrete body and in this resin is placed a mat 15 of fiberglass pre-saturated with a composition of polyester resin, calcium carbonate filler and monostyrene, together with the usual catalysts and activators (or saturated in situ by the resin composition placed in the pan). An excess of the resin is placed on the face of the block or between the fiber mat and the block, and the dressed face 12a of the block is then pressed down onto this assembly in the pan.

In using prior prepared fibrous mat with resin composition thereof and therein, for example, "pre-impregnated mat" as it is known in the art, I have found it advantageous by design to provide enough plastic resin for bonding in an excess amount of plastic resin over that required for saturation of the mat to effect the bonding into and of and on the concrete and masonry body, which said plastic resin is squeezed or otherwise put into the pores of the concrete or masonry body, e. g., by the processing pressures or processing means. The viscosity characteristics of the plastic resin compositions and of filled and unfilled resins vary by design and are related to the balanced designed features sought in any given concrete or masonry type constructions and is well disclosed in my copending applications.

This assembly in the mold 16 is placed in a heated platen press and pressed at a temperature and pressure adapted to set up the resin and to drive it not only into the pores exposed at the dressed face of the block but especially to drive it into deeper pores connected therewith. When the resin has sufficiently polymerized and cured, the block is removed from the making equipment, e. g., or pan or caul or working and casting surface and is found to have a hard polish surface and attractive appearance, as well as great strength, being fully bonded and keyed into the concrete structure.

Resin composition of both thermoplastic and setting types can be used, and can be used without fiber reinforcement, although greater advantages of the invention are realized when fiber is used in mat or woven form. The most advantageous fiber is high tensile glass fiber, but in general I may use any textile fiber compatible with the resin selected.

The sawing, grinding or dressing of the surface of the concrete provides a plane surface which when placed horizontally level allows sprayed or flowed on plastic compositions to level out to uniform thickness of pentration into the concrete pores and interstices and at the same time provides a uniformly thick surface layer equidistant above the concrete face.

The thermoplastics such as vinyls of the nature of polyvinyl actate when emulsified as a water emulsion or plastics in other solvent solutions readily flow out into smooth, high bond strength, abrasion and corrosion-resistant and resilient surface structures. Thermosetting resins act similarly.

The addition of moisture-free silica of 99.0–99.7% silicon dioxide which is free from contaminating salts with particle sizes ranging from 0.015 to 0.020 micron to plastic resins in the amount of 1% increases the viscosity of a nonthixotropic polyester resin enabling the placing of the resin mixture without run off. Colloidal silica and the like also act as suspending agents, flattening agents, transparent extenders and thickening and gelling agents and are useful especially in control of flow and placement of plastic resins I use.

When I desire to use the decorative values of the raw concrete, I saw or grind the surface to expose the color and texture. Acid treatment of concrete also provides a means readily used to expose color and texture of both sawed and unsawed concrete. Clear or lightly tinted transparent or transluscent plastic mixtures rather than opaque plastic mixtures are used for permeation and penetration of the concrete and to provide the high strength surface structure. By selecting the color of the aggregates to make pleasing esthetic combinations it is possible to make an infinite number of remarkably beautiful composite structural members.

An example of one such raw concrete mix is the use of Arizona pink tufa crushed and screened to ⅜" to ½" particle size and used as the large aggregate of the concrete mix. The smaller particles of the mix down to sand can be grey-black natural cinders and the sand can be white ocean or Ottowa sand with the cement being White Atlas Portland cement or its equivalent.

When the saw cuts off a thin section of the concrete the various colors show in section. Water white resins and fiberglass reinforcement do not obscure the esthetic effects obtained.

Concrete aggregates such as Rocklite which are man made by burning Ventura Clay in a processing plant at 1950° F. to 2100° F. have a shell-like skin enclosing a very porous body. The sawing through this body exposes a much greater area for penetration and permeation of the plastic resin used. When water worn sand and gravel is used the aggregates are rounded and do not show much "color" until they are sawed through. The pores present in practically all concrete or the like occur as a measurable quantity of porosity and this measurable quantity is a function of both the structural design and the esthetic design of my invention.

This application is a continuation-in-part of my copending application Serial No. 229,852 filed June 4, 1951.

I claim:

1. The method of making a composite structural member which comprises dressing a part of a body of concrete or the like porous structural material to give a face truly conforming to a predetermined surface and to leave open a substantial number of pores adjoining said surface, applying to said surface a flowable material polymerizable to a high strength resin and a mat of high strength fiber and pressing the resulting assembly in a mold having its face substantially equidistant throughout from said dressed surface until said polymerizable material is filled into said open pores and polymerizing said material.

2. The method of making a composite structural member as claimed in claim 1 in which the mat is impregnated with at least a portion of said flowable material.

3. The method of claim 1 wherein a mat is impregnated with a plastic resin composition containing a discrete filler and a catalyst, said mat being impregnated in a quantity in excess of that necessary to saturate the mat.

4. The method of claim 1 wherein a flowable material polymerizable to a high strength resin is placed on said dressed surface and a mat of unsaturated fibrous material is placed on said flowable material, and having said flowable material flow through said mat.

5. The method of claim 1 wherein at least one of the surfaces of said precast cementitious block is dressed, placing a plastic resin composition in a mold, placing a body of unsaturated fibrous material in said mold onto said plastic resin composition, placing the dressed surface of said cementitious block onto the plastic resin composition in said mold.

6. The method of making a composite structural member which comprises providing a precast masonry block, at least one of the surfaces of which is dressed by passing said block through a masonry saw to saw off a thin layer from the face of said masonry block leaving the block with a substantially plane face, removing substantially all dust and particles from the sawing operation, drying said masonry block to discrete depth from said sawed surface, placing a polyester resin composition containing a discrete filler, catalyst, activator, color, and viscosity control agent in a mold having its face substantially equidistant throughout from said dressed surface, placing a mat of fibrous glass onto said polyester resin composition and having said mat of fibrous glass saturated by less than all of the polyester resin composition and having a surplus thereon, placing the precast masonry block with its cut surface in contact with said assembled materials in said mold in a heated platen press and pressing the resulting assembly in said mold having its face substantially equidistant throughout from said cut surface, such pressing at a temperature and at a pressure adapted to force at least a portion of said surplus of said polyester resin composition into the pores exposed at the dressed face of said masonry block and especially to drive it into deeper pores connected therewith, and when said polyester resin composition has sufficiently polymerized and cured, the said masonry block is removed from said making equipment, said masonry block thus made having said mat of fibrous glass fixedly positioned in said polyester resin composition and having a hard polish surface and an attractive appearance as well as great strength with the said polyester resin composition fully bonded and keyed into said precast masonry block.

7. The method of making a composite structural member which comprises providing a precast masonry block, at least one surface of which is sawed to a substantially plane face as claimed in claim 6 in which the plastic resin composition is transparent and the color of the sawed surface of said precast masonry block shows through the mat of fibrous material bonded to said precast masonry block by said plastic resin composition.

8. The method of making a composite structural member as claimed in claim 7 in which the plastic resin composition is translucent.

9. The method of making a composite structural member as claimed in claim 6 in which the sawed surface of said precast masonry block is dressed to substantially close tolerance and the laminated construction comprised of said plastic resin composition and its enclosed fibrous reinforcement provides uniformity of structural load-bearing characteristics in and of the said composite structural member.

10. The method of making a composite structural member as claimed in claim 6 in which the plastic resin composition is opaque.

11. The method of making a composite structural member as claimed in claim 6 in which the plastic resin composition is an epoxy resin, catalyst and discrete filler.

12. The method of making a composite structural member as claimed in claim 6 in which an unsaturated polyester resin composition containing a catalyst, calcium carbonate filler and monostyrene is placed in a molding pan of stainless steel with a perfectly plane molding face treated with a release agent and in this resin composition placing a mat of fiber glass presaturated with a composition of unsaturated polyester resin, catalyst, calcium carbonate filler and monostyrene, said unsaturated polyester resin composition provided in excess of the amount required for presaturation of said fiber glass placed on the dressed face of said precast masonry block, and the dressed face of the said masonry block then pressed down on the assembled materials in said stainless steel pan, said excess of unsaturated polyester resin penetrating and permeating the said precast masonry block while under an increasing pressure and at a temperature adapted to polymerize and cure said polyester resin composition into a hard, smooth laminated surface construction bonded and interlocked into the porous body of said precast masonry block.

References Cited in the file of this patent

UNITED STATES PATENTS

| | | |
|---|---|---|
| 1,471,990 | Wert | Oct. 23, 1923 |
| 1,581,795 | Delaney | Apr. 20, 1926 |
| 1,953,337 | Carson | Apr. 3, 1934 |
| 2,193,635 | Marshall | Mar. 12, 1940 |
| 2,377,846 | Dreyfus et al. | June 5, 1945 |
| 2,414,125 | Rheinfrank | Jan. 14, 1947 |